(12) United States Patent
Patino et al.

(10) Patent No.: US 11,858,545 B2
(45) Date of Patent: Jan. 2, 2024

(54) VEHICLE HAVING A SUPPORT STRUCTURE

(71) Applicant: DEERE & COMPANY, Moline, IL (US)

(72) Inventors: Mario Patino, Ludwigshafen (DE); Mattias Lang, Gaiberg (DE); Curtis P. Thoreson, Janesville, IA (US); Norbert Groessbrink, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 234 days.

(21) Appl. No.: 17/289,206

(22) PCT Filed: Oct. 18, 2019

(86) PCT No.: PCT/EP2019/078384
§ 371 (c)(1),
(2) Date: Apr. 27, 2021

(87) PCT Pub. No.: WO2020/088955
PCT Pub. Date: May 7, 2020

(65) Prior Publication Data
US 2021/0394830 A1    Dec. 23, 2021

(30) Foreign Application Priority Data

Oct. 29, 2018   (DE) .................. 10 2018 218 505.0

(51) Int. Cl.
*B62D 21/03*     (2006.01)
*B60K 17/24*     (2006.01)
*B62D 27/06*     (2006.01)

(52) U.S. Cl.
CPC .............. *B62D 21/03* (2013.01); *B60K 17/24* (2013.01); *B62D 27/065* (2013.01)

(58) Field of Classification Search
CPC ...... B62D 21/03; B62D 27/065; B62D 21/04; B62D 21/186; B60K 17/24; B60K 1/00
(Continued)

(56) References Cited

U.S. PATENT DOCUMENTS 4,746,145 A    5/1988  Furuichi et al.
4,887,862 A *  12/1989 Bassi .................. B62D 25/082
                                          52/783.17
(Continued)

FOREIGN PATENT DOCUMENTS

BE        552438 A    12/1959
CN     102638967 A     8/2012
(Continued)

OTHER PUBLICATIONS

International Search Report issued for PCT/EP2019/078384 application dated Feb. 10, 2020. (4 pages).

*Primary Examiner* — Pinel E Romain
(74) *Attorney, Agent, or Firm* — KLINTWORTH & ROZENBLAT IP LLP (57) ABSTRACT

A vehicle having a support structure includes a front structural section for receiving a front axle assembly and a rear structural section opposite the front structural section in the longitudinal direction of the vehicle. A support part is arranged between the front structural section and the rear structural section as part of the support structure. The support part has a support wall which runs in a self-contained manner in the circumferential direction transversely with respect to the longitudinal direction of the vehicle.

11 Claims, 6 Drawing Sheets

(58) Field of Classification Search
USPC .......................................................... 296/204
See application file for complete search history.

(56) References Cited

U.S. PATENT DOCUMENTS

| | | | |
|---|---|---|---|
| 6,216,812 B1 | 4/2001 | Pertusi | |
| 8,257,214 B2 * | 9/2012 | Knoblauch | ............ B60K 6/365 |
| | | | 475/5 |
| 10,421,493 B2 * | 9/2019 | Saje | ..................... B62D 25/025 |
| 11,038,396 B2 * | 6/2021 | Raya | ........................ H02K 3/24 |
| 2011/0179904 A1 * | 7/2011 | Harnden | ............. F16H 57/0483 |
| | | | 184/6.12 |
| 2013/0306394 A1 | 11/2013 | Theodore | |

FOREIGN PATENT DOCUMENTS

| | | | | |
|---|---|---|---|---|
| DE | 948366 C | 8/1956 | | |
| DE | 1172548 B | 6/1964 | | |
| DE | 102004038487 A1 * | 3/2006 | ............ | B62D 21/02 |
| EP | 0158346 A2 | 10/1985 | | |
| EP | 3085566 A1 | 10/2016 | | |
| EP | 2684775 B1 * | 3/2017 | ........... | B60K 15/063 |
| FR | 1012996 A | 7/1952 | | |
| FR | 70632 E | 6/1959 | | |

\* cited by examiner

VEHICLE HAVING A SUPPORT STRUCTURE

CROSS-REFERENCE TO RELATED APPLICATIONS

This application is a U.S. National Phase filing under 35 USC § 371 of the PCT International Application No. PCT/EP2019/078384, which has an international filing date of Oct. 18, 2019, designates the United States of America, and claims the benefit of German Application No. 102018218505.0, which was filed on Oct. 29, 2018, the disclosures of which are hereby incorporated by reference.

FIELD OF THE DISCLOSURE

The present disclosure relates to a vehicle having a support structure.

BACKGROUND

Vehicles can include a support structure for supporting a front axle and a rear axle.

SUMMARY

Vehicles can include a support structure which has a front structural section for receiving a front axle assembly and a rear structural section opposite the front structural section in the longitudinal direction of the vehicle.

A support structure of this type serves to form a stable framework or a frame for the vehicle, to which individual vehicle functions, such as, for example, axles, suspension, steering, and motor/engine are fastened. Depending on the use of the support structure, the latter is used to convey great torsional rigidity, great flexural strength and/or a great support force while having a simultaneously compact construction and as little weight as possible.

The present disclosure is based on the object of improving the load-bearing capacity of the support structure in respect of its torsional rigidity.

This object is achieved by a vehicle having the features of the one or more independent claims.

Further advantageous refinements of the vehicle according to the disclosure emerge from the one or more dependent claims.

According to some embodiments, the support structure of a vehicle has a front structural section and a rear structural section that is opposite in the longitudinal direction of the vehicle. The front structural section can receive a front axle assembly. A support part is arranged between the front and the rear structural section as part of the support structure, the support part having a support wall which runs in a self-contained manner in the circumferential direction transversely with respect to the longitudinal direction of the vehicle, i.e. the support part has a cross section which is self-contained in terms of circumference or along the circumferential direction. By this means, the support part forms a particularly stable part of the support structure and contributes to great torsional rigidity of the entire support structure. Torsional loads occurring along the longitudinal direction of the vehicle can be efficiently and stably absorbed by the support part.

Depending on the dimensioning of the support structure and application of the support part, the support wall can be self-contained circumferentially along its entire extent in the longitudinal direction of the vehicle or can be self-contained in sections circumferentially in the longitudinal direction of the vehicle. The support wall can also be perforated at suitable locations by at least one wall opening without a significant reduction in the torsional rigidity, in order, for example, to facilitate service or installation activities at the vehicle.

The support part can be of integral design (for example as a cast part) or of multi-part design. In the case of the multi-part variant, the individual parts—for example an upper and a lower half—are connected fixedly to one another (for example welded connection or screw connection).

The front structural section is preferably dimensioned in such a manner that it is suitable for receiving different types of front axle or different front axle assemblies (for example unsprung, spring-loaded for individual wheels). By this means, different front axle assemblies or types of front axle can be combined with the same support part and can be, for example, flange-mounted thereon. This contributes to the entire support structure being constructed in the manner of a construction kit, and modularly and thus cost-effectively.

The front structural section optionally has an intersection for fastening a holding frame for a front power lift and/or for a front power-take-off. The front structural section optionally has at least one further intersection for the preassembly of a vehicle unit (for example radiator).

The rear structural section has, for example, individual frame parts of the support structure. In one embodiment, the structural section receives a rear axle of the vehicle or a rear axle assembly. In further embodiments, the structural section can have housing-like parts of individual vehicle components.

The vehicle is preferably a utility vehicle, in particular an agricultural vehicle (for example tractor).

The self-contained profile of the support wall in the circumferential direction can be considered to be a cross section, in particular profile cross section, of the support part. The cross section preferably differs along the longitudinal direction of the vehicle. By this means, the support part can be adapted in a material-saving manner to the respectively desired dimensioning of the support structure in respect of different properties, such as weight, center of gravity position, torsional rigidity, flexural rigidity and support force. In its region facing the front structural section, the support part, and in particular the cross section of its support wall, is of such small dimensions, in a preferred embodiment, that, firstly, the anticipated torsional loads can be stably absorbed and, secondly, particularly great steering angles of the vehicle wheels are permitted. This contributes to small turning circles of the vehicle.

The cross section under consideration can represent the profile of an outer wall or an inner wall of the support wall. For example, the cross section of the support part can be tapered in the direction of the front or rear structural section, in particular with the effect of the vehicle having a reduced turning circle. The self-contained support wall preferably has, at least in sections, a circular cross section, as a result of which the torsional rigidity is increased further. The torsional rigidity and flexural rigidity of the support part can also be assisted by further support elements connected to the support part, for example by horizontally running support elements in the bottom region of the support part and in the tip region of the support part opposite the bottom region in the vertical direction.

For a simple connection in terms of installation to the front structural part, the support part preferably has a front fastening intersection. For a simple connection in terms of installation to the rear structural section, the support part preferably has a rear fastening intersection. A direct connection to individual parts of the rear structural section can be provided here. Alternatively or additionally, the support part can be indirectly connected to the rear structural section by the support part being fastened to a vehicle component (for example a transmission casing or transmission/differential unit) which, in turn, is connected fixedly to the rear structural section.

The aforementioned connection of the support part to at least one of the structural sections is preferably rigid and/or releasable. For example, the respective fastening intersection has at least one releasable clamping element (for example screw bolt). The clamping force direction thereof is effective in particular in the longitudinal direction of the vehicle or, for example, in a plane spanned by the longitudinal direction of the vehicle and the transverse direction of the vehicle, and thereby connects the support part to the respective structural section in a mechanically stable manner. Alternatively or additionally, at least one connecting bolt can also be provided. The latter passes through the respective fastening intersection and the associated structural section preferably in the transverse direction of the vehicle and thereby contributes to a cost-effective and simultaneously mechanically stable connection within the support structure. The individual clamping elements and/or connecting bolts that are used can be offset from one another in a geometrically different manner along the longitudinal direction of the vehicle. A fastening intersection preferably flanks the associated structural section on both sides in such a manner that a connecting bolt passes through the fastening intersection at a plurality of regions (in particular two) which are spaced apart from one another by means of the associated structural section. By this means, particularly high torsional loads can be absorbed in a stable manner. Alternatively or additionally, this fastening principle can also be applied to a fastening intersection which is flanked on both sides by the associated structural section.

At least one spacer is preferably arranged between the fastening intersection and the associated structural section. By this means, differently dimensioned support structures can be realized with the same support part, which reduces the costs for producing the individual support part and also the different support structures. In addition, the at least one spacer permits a technically simple adaptation of the support structure to different types of vehicle and in particular to different wheel bases.

The support part advantageously serves, in an additional function, to support a vehicle component. This component has, for example, a sump for oil or fuel. The component can be connected fixedly and releasably to the support part via suitable fastening means. Alternatively, the component or a part thereof can be connected non-releasably to the support part, in particular can be produced integrally with the support part. Since the support part has a supporting function, the vehicle component arranged thereon is correspondingly relieved of load and does not have to absorb significant load forces. Consequently, the vehicle component can be at least partially of lightweight construction, which is advantageous in particular for the production of a drive motor or internal combustion engine as a vehicle component.

The vehicle component is preferably of multi-part design. In order to contribute to a defined and stable arrangement of the vehicle component in the vehicle, a first part of the component can be arranged fixedly on the support part, in particular can be produced integrally with the support part. For assembly of the component easily in terms of installation, the first part preferably has an installation intersection to which at least one further part of the component is fixable.

The aforementioned first part of the component has in particular an open, trough-like cavity, which is bounded by a wall, and the aforementioned installation intersection for securing a drive motor or internal combustion engine. When the motor or engine is secured, the trough-like cavity is automatically fluidically sealed. The trough-like cavity thereby acts as an oil sump for a motor or engine unit which can be brought by the installation intersection, with little outlay on installation, into a defined fitting position and completed in a technically simple manner to form a functional vehicle component.

The installation intersection of the first part of the component affords the further advantage that it can serve as an installation template or adapter for an error-free assembly of different versions of a component (for example different motor or engine blocks). In addition, suitable spacer elements can be provided at the installation intersection such that the same support part is suitable for the assembly of different versions of a component and optionally also for functionally different components. Damper elements and/or sealing elements can also be arranged at the installation intersection (for example for sealing against liquids, in particular oil).

In a further preferred embodiment, the support wall of the support part bounds a receiving channel along the circumferential direction for receiving a drive shaft of a drive train of the vehicle. By this means, the support part, in a further function without an additional technical outlay, provides stable protection for the drive shaft against possible soiling, damage or other impairments.

The front structural section is preferably produced from a steel, for example as a cast part or as a welded assembly. It can be formed in the manner of a cage with a front and rear cage wall substantially closed in the longitudinal direction of the vehicle and with an upper and lower cage wall substantially closed in the vertical direction of the vehicle. The front axle assembly can then be handled in an installation-friendly manner laterally, i.e. in the transverse direction, and is at the same time effectively protected in the other directions against possible impairments.

Depending on specific installation and fitting conditions, individual wall regions of the front structural section can also have recesses or interruptions. By this means, during and after the installation, the movement clearance for the front axle assembly and/or for other vehicle units and components can be increased.

In order to retain the aforementioned advantages as far as possible and at the same time to contribute to a lightweight construction of the support structure, the front structural section preferably has a grid-like structure with a plurality of structural struts. At least some of the structural struts automatically form a boundary or a type of silhouette for a receiving space, which is accessible in the transverse direction of the vehicle, for receiving the front axle assembly. Structural struts of particularly flat design contribute to the material-saving construction of the structural section and facilitate obstacle-free movements of other vehicle parts.

If the front structural section, as viewed in the vertical direction of the vehicle, has an upper and a lower wall or boundary (for example by means of the structural struts) between the front axle assembly, this permits a lighter design of the support structure, since the moment of resistance of the front structural section is particular high because of the material arranged at the top and bottom. This also promotes the torsional properties of the front structural section and therefore of the entire support structure.

The front structural section can be assembled integrally or from a plurality of parts. Individual parts are, for example, connected releasably to one another, in particular screwed. The variant of the front structural section assembled from a plurality of parts has the advantage that, first of all, the front axle assembly can be fitted in a particularly installation-friendly manner with increased movement clearance, and then the front structural section is completed with the parts still missing (for example parts arranged below the front axle assembly in the vertical direction of the vehicle).

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The vehicle according to the disclosure will be explained in more detail below with reference to the attached drawings. Components corresponding or comparable in respect of their function are indicated by the same reference signs. In the drawings.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
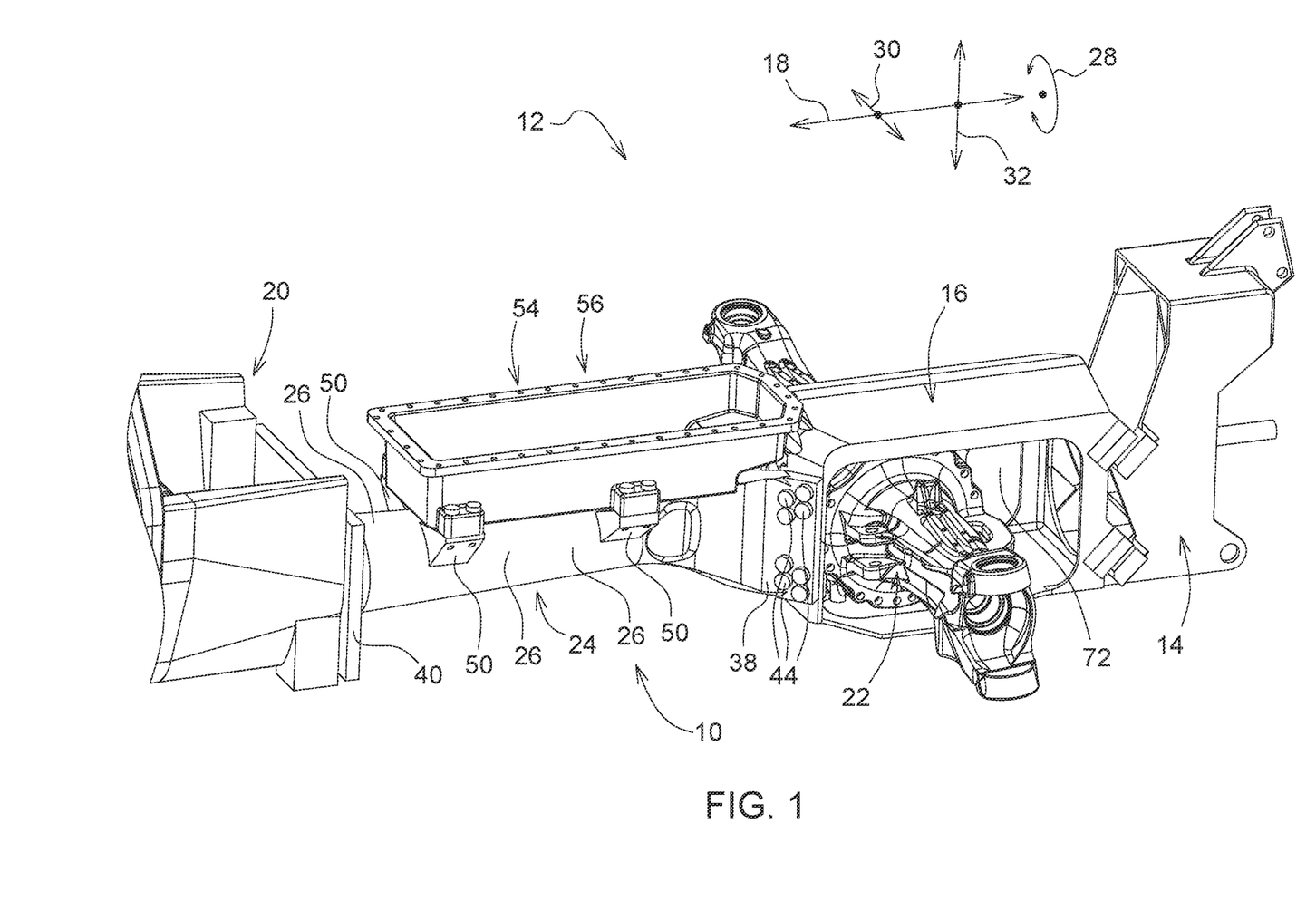
FIG. 1 shows a perspective illustration of a first embodiment of the support part in its installation position between a front and a rear structural section of the support structure.

FIG. 1 shows part of a support structure 10 of an agricultural vehicle 12, not illustrated in detail here, with a holding frame 14 for a front power lift. The support structure 10 has, inter alia, a front structural section 16 and a rear structural section 20 that is opposite in the longitudinal direction 18 of the vehicle. The front structural section 16 serves for receiving a front axle assembly 22. A support part 24, as part of the support structure 10, is arranged between the front structural section 16 and the rear structural section 20 along the longitudinal direction 18 of the vehicle. A support wall 26 of the support part 24 is self-contained transversely with respect to the longitudinal direction 18 of the vehicle, i.e. along a circumferential direction 28. The torsional rigidity and stability of the support structure 10 can thereby be supported.

It is illustrated with reference to FIG. 2 that—independently of the actual detailed configuration of the support part 24—the profile of the support wall 26, that is self-contained in the circumferential direction 28, forms a cross section A. The cross section A customarily lies in a cross-sectional plane arranged approximately perpendicularly to the longitudinal direction 18 of the vehicle. The cross-sectional plane is therefore spanned by a conventionally approximately horizontally running transverse direction 30 and an approximately vertically running vertical direction 32 of the vehicle 12. The support wall 26 can have a self-contained wall profile along the entire extent in the longitudinal direction 18 of the vehicle or else in sections along the longitudinal direction 18. In a departure from the configuration of the support part 24 that is merely indicated schematically in FIG. 2, it is illustrated there that the cross section A is dimensioned differently along the longitudinal direction 18 of the vehicle. For example, an initially square cross section A1 can merge into an oval cross section A2, then into a circular cross section A3 and subsequently into an approximately horseshoe-shaped cross section A4. The cross section A under consideration can relate to an outer wall 34 or to an inner wall 36 of the support wall 26.

Figure 2:
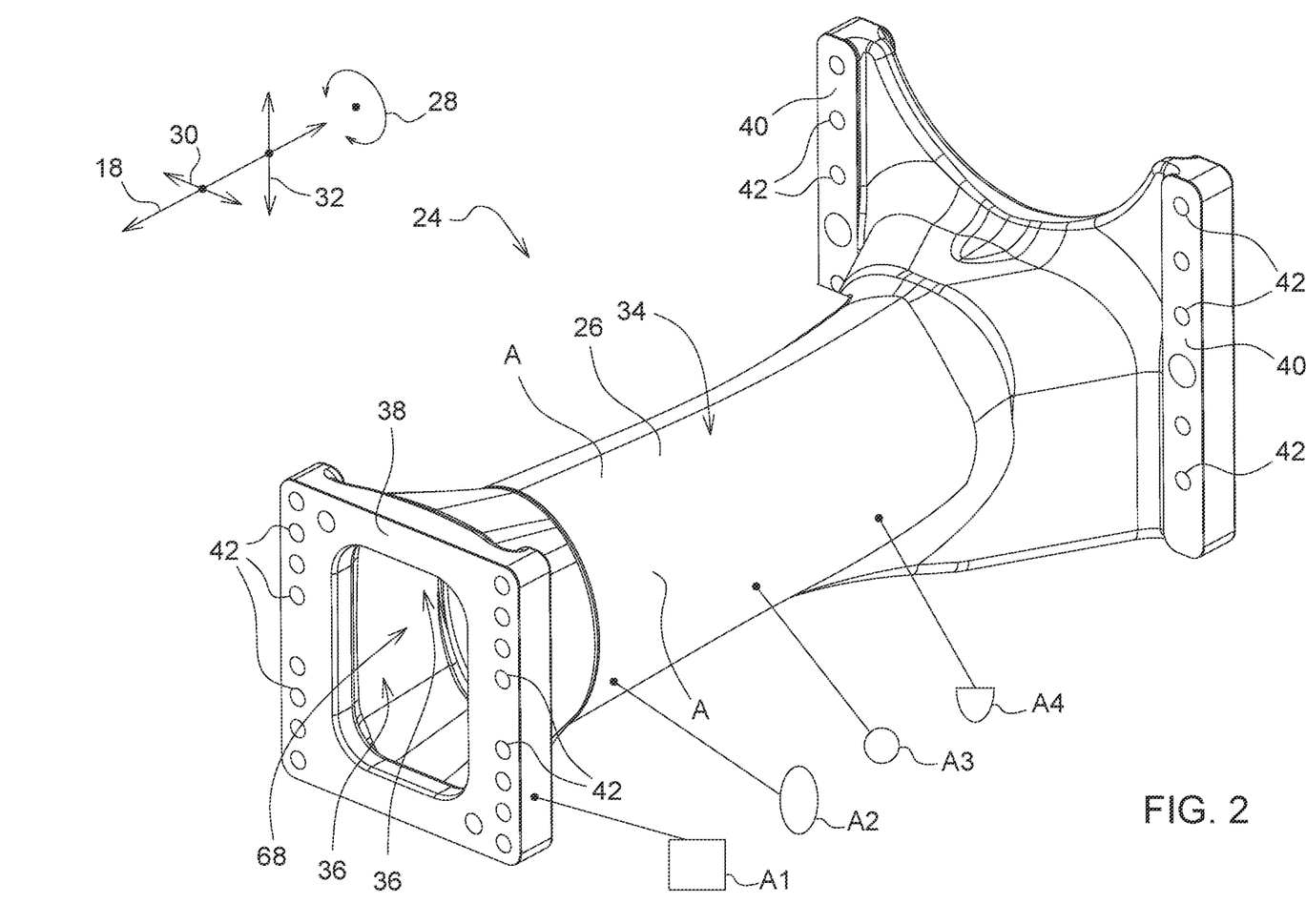
FIG. 2 shows a perspective illustration of the support part in a further embodiment.

Furthermore, it can be seen in FIG. 2 that the support part 26 has a flange-like front fastening intersection 38 in order to connect the support part 26 to the front structural section 16. The support part 26 analogously also has a flange-like rear fastening intersection 40 in order to connect the support part 26 to the rear structural section 20. As illustrated in FIG. 2, the two fastening intersections 38, 40 can basically be configured differently.

The connections between the fastening intersections 38, 40 and the structural sections 16, 20 are preferably rigid. For this purpose, connecting means which have yet to be described are provided with reference to FIG. 3a to FIG. 3e. The connecting means, depending on the configuration, can produce a releasable or non-releasable connection between the fastening intersections 38, 40 and the structural sections 16, 20. The connecting means pass, for example, through holes 42 on the fastening intersections 38, 40.

Figure 3A:
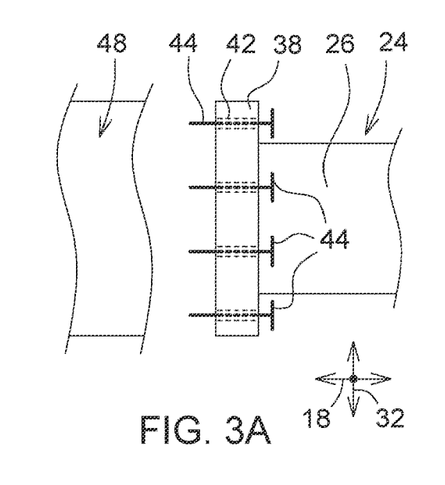
FIGS. 3a to 3e show schematic illustrations of various embodiments of a fastening intersection of the support part for connecting to the front structural section.
Figure 3B:
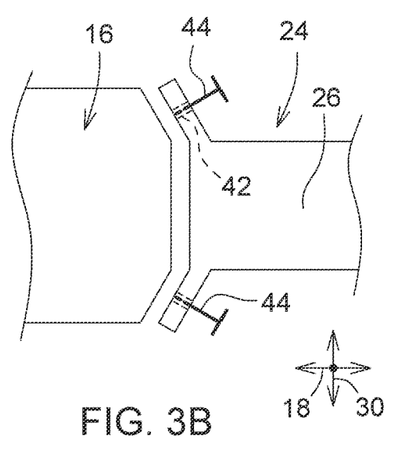
Figure 3C:
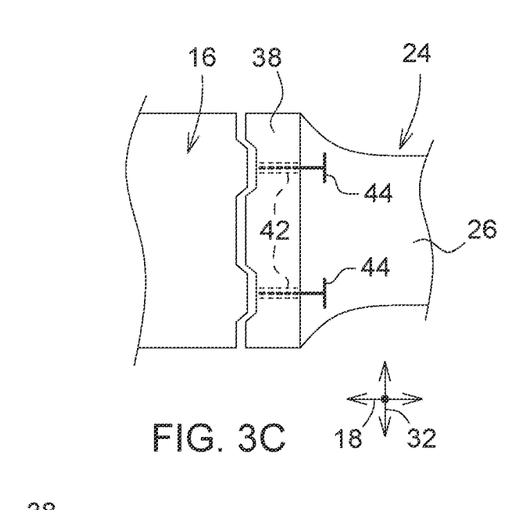
Figure 3D:
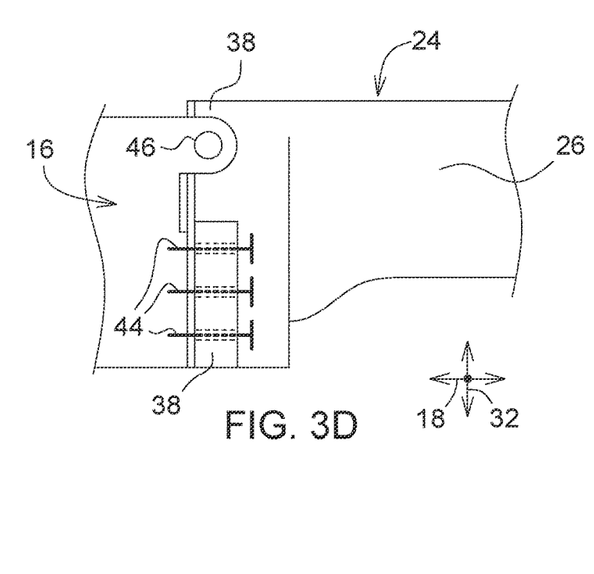
Figure 3E:
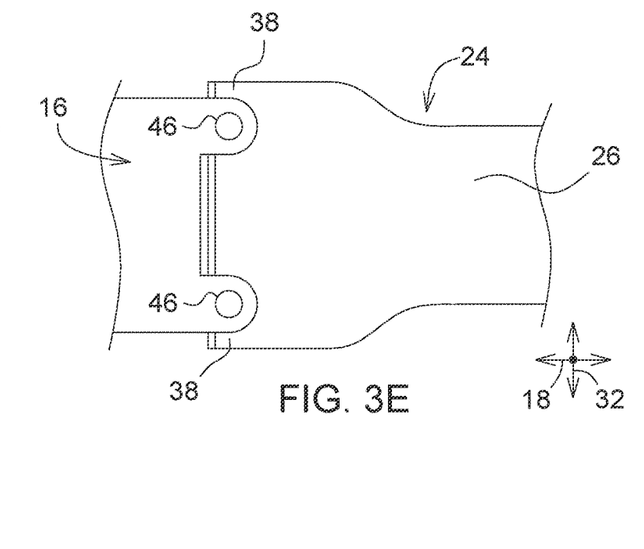

Such connecting means are illustrated in FIG. 3a to FIG. 3e. For example, they are clamping elements 44 in the form of screw bolts which pass through the through holes 42 and bring about bracing between the front structural section 16 and the support part 24. The clamping force direction acts here, for example, substantially horizontally in the longitudinal direction 18 of the vehicle (FIG. 3a, FIG. 3c, FIG. 3d) or at a horizontal angle (for example approximately 30° to 45°) with respect to the longitudinal direction 18 of the vehicle (FIG. 3b). The aforementioned connection can also be supported by connecting bolts 46 which pass through the front structural section 16 and the fastening intersection 38 of the support part 24 in the transverse direction 30 (FIG. 3d). Alternatively, the connection between the front structural section 16 and the support part 24 can also be realized by means of a plurality of connecting bolts 46 without the clamping elements 44 aligned in the longitudinal direction 18 of the vehicle being used (FIG. 3e). Nevertheless, the connecting bolts 46 if configured correspondingly (for example as screw bolts) can also bring about a clamping force which is then aligned in the transverse direction 30.

The connecting techniques disclosed here between the front structural section 16 and the support part 24 can in principle also be used at the fastening intersection 40 for connecting the rear structural section 20 to the support part 24.

For adaptation of the support part 24 to differently dimensioned support structures 10, spaces 48 can be provided (FIG. 3*a*) which can be arranged between the support part 24 and the associated structural section 16, 20.

Figure 4:
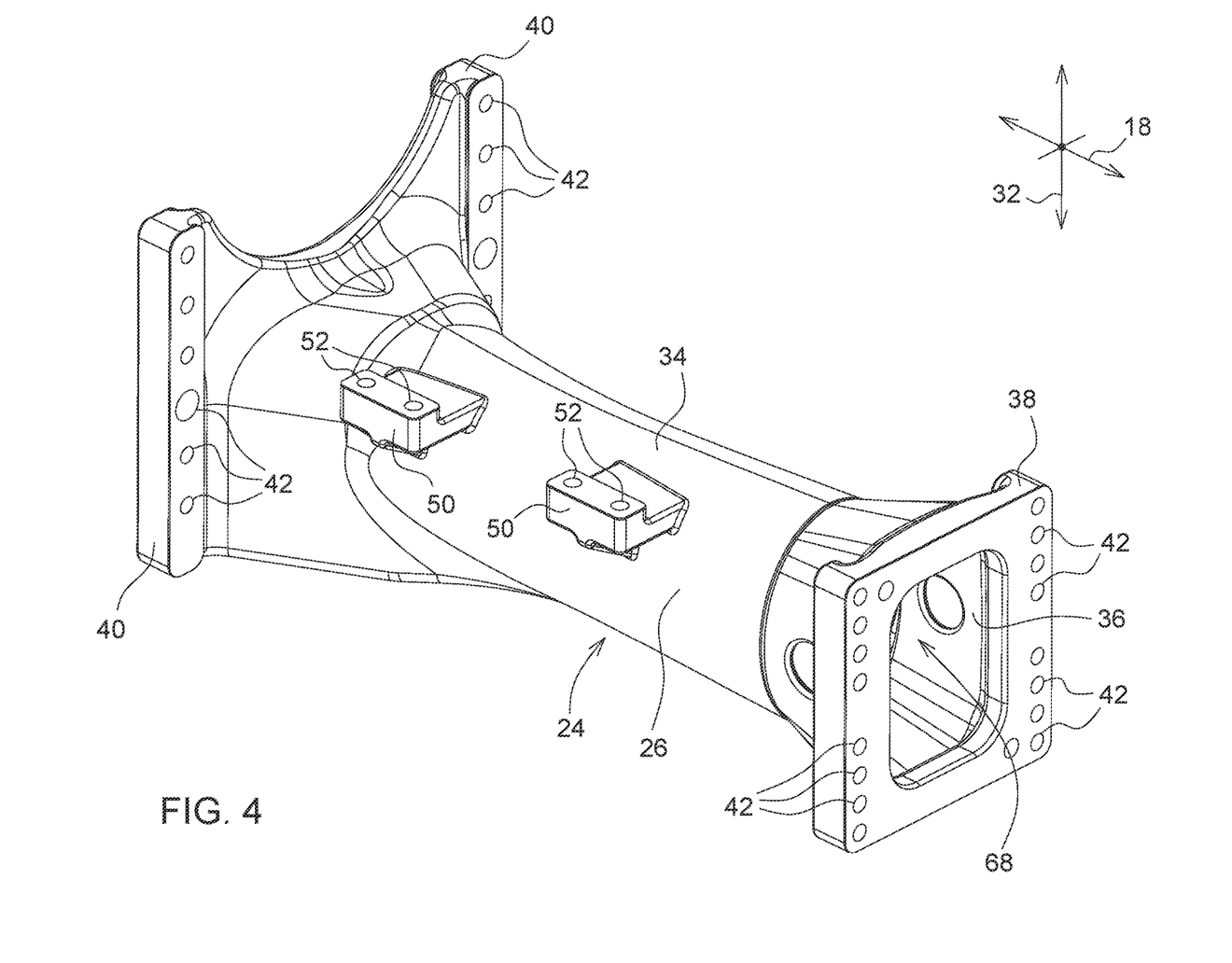
FIG. 4 shows a perspective illustration of a further embodiment of the support part.

Two extension arms 50 which have fixing holes 52 (for example internal screw threads) which are aligned in the vertical direction 32 can be seen in FIG. 4. The extension arms 50 are connected preferably integrally to the support wall 26. Further extension arms 50 and optionally also in a different configuration can be arranged on the support wall 26, as is illustrated, for example, in FIG. 1. The extension arms 50, together with suitable fastening means, serve to mount a vehicle component 54 or at least a part of the vehicle component 54 on the support part 24.

The vehicle component 54 (for example radiator unit or motor or engine unit) can be mounted as a complete block on the support part 24. Alternatively, the vehicle component 54 can consist of a plurality of parts, of which first of all one part is mounted on the support part 24, as is illustrated in FIG. 1 by way of example with reference to an oil sump 56 as part of an internal combustion engine unit.

Figure 5:
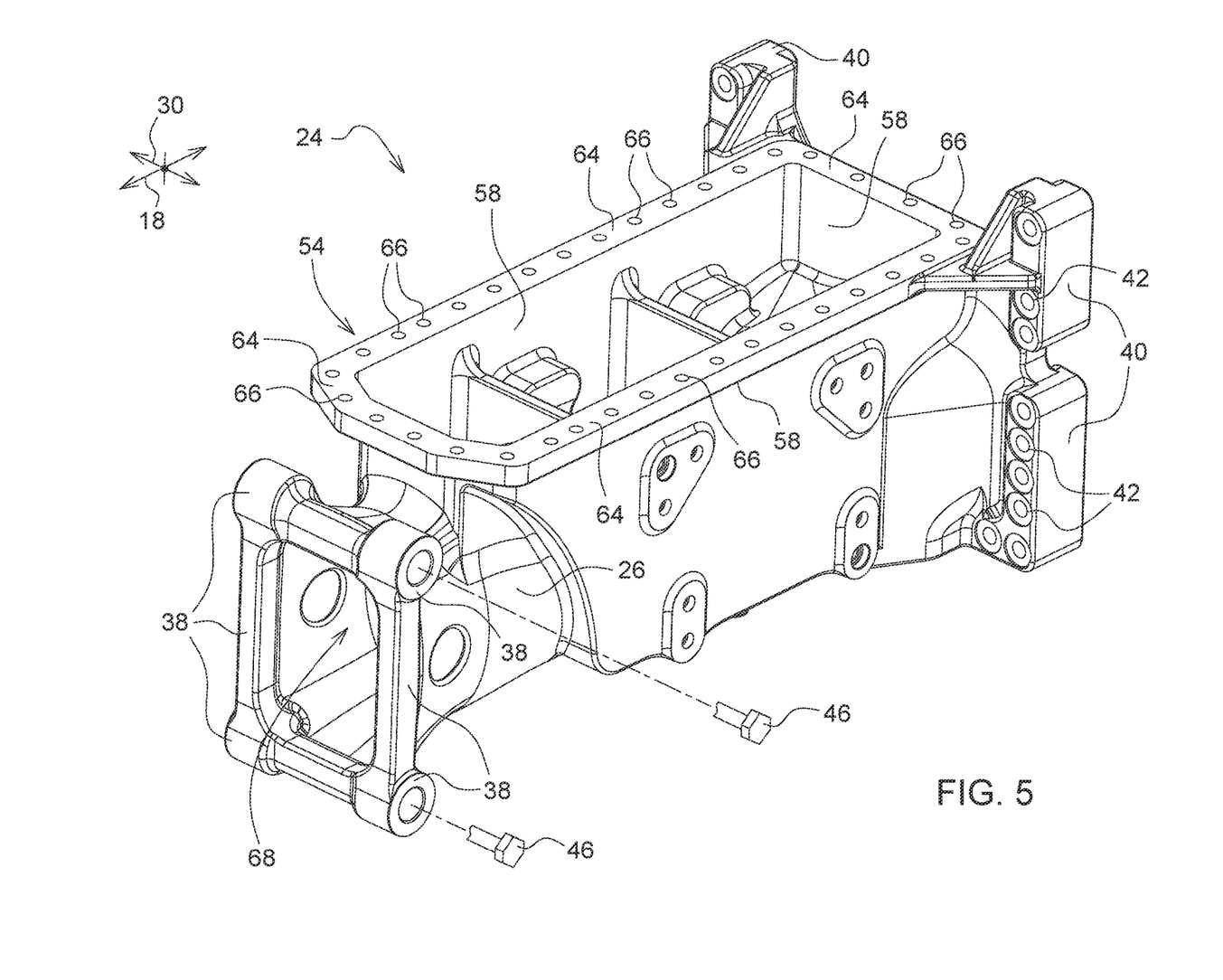
FIG. 5 shows a perspective illustration of a further embodiment of the support part.
Figure 6:
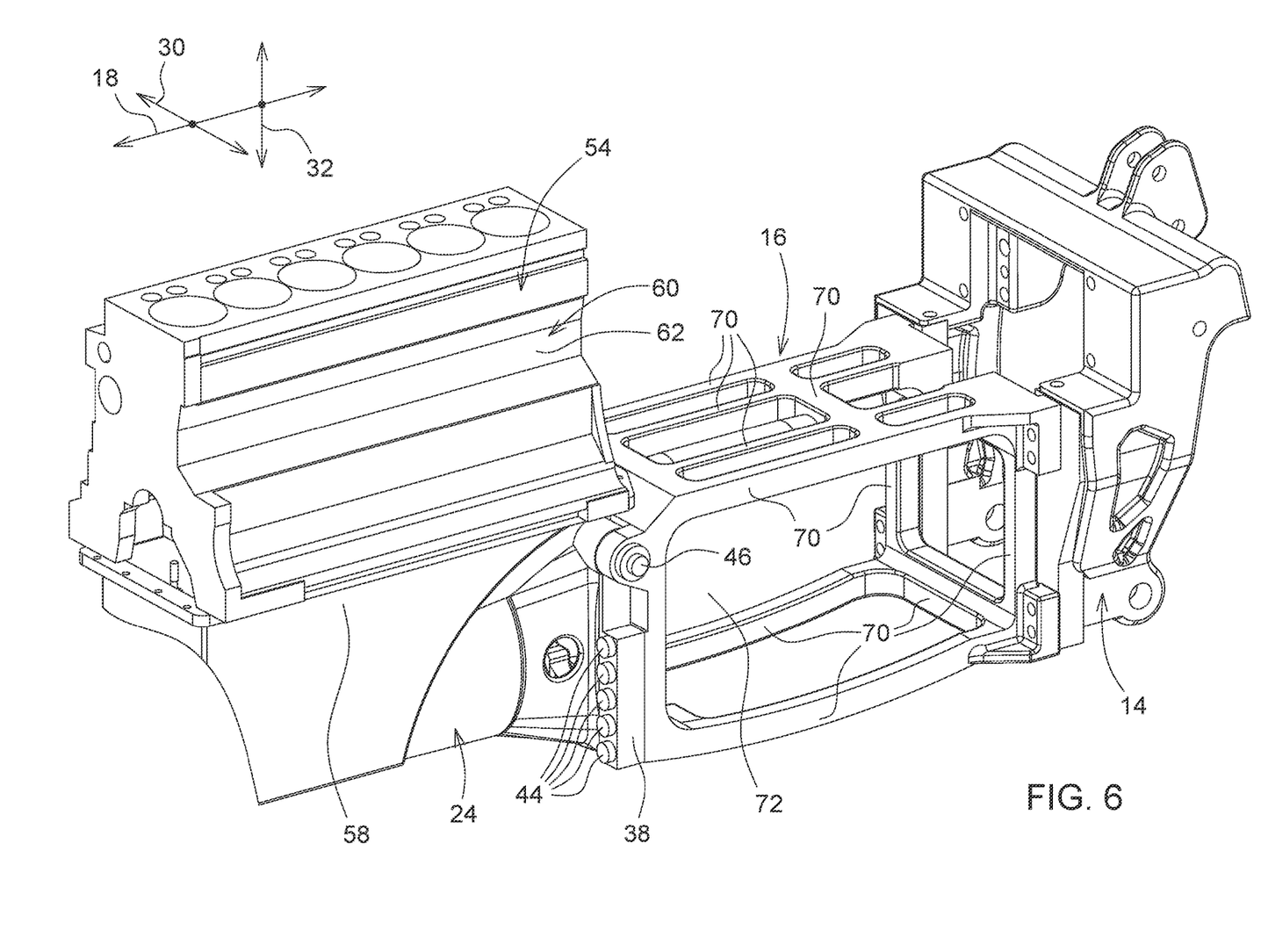
FIG. 6 shows a perspective illustration of a further embodiment of the support part in its installation position on a front structural section of the support structure.

In a further embodiment, one part of the vehicle component 54 is fixedly connected from the outset to the support part 24, in particular is produced integrally therewith, as is illustrated in FIG. 5 with reference to the component wall 58. The latter bounds a cavity which is effective as an oil sump for a motor/engine unit 60 as the vehicle component 54 (FIG. 6). For the correct securing or installation of the motor/engine unit 60, the part 62, which is assigned to the cylinders thereof, can be secured on an installation intersection 64—optionally with the interposition of damper elements and/or sealing elements—of the component wall 58. For this purpose, the component wall 58 has a multiplicity of securing holes 66 for, for example, a screw connection to the motor/engine part 62.

The support wall 26 of the support part 24 bounds a receiving channel 68 along the circumferential direction 28 for receiving a drive shaft (not illustrated here) of a drive train of the vehicle 12.

FIG. 6, in comparison to FIG. 1, illustrates a further embodiment of the front structural section 16. In this embodiment, the structural section 16 has a grid-like structure with a plurality of structural struts 70. In the fitted state of the support structure 10, the structural struts 70 are preferably substantially arranged in one of the directions 18, 30, 32. They bound a receiving space 72, which is accessible in the transverse direction 30 of the vehicle, for receiving the front axle assembly 22.

The terminology used herein is for describing particular embodiments and is not intended to be limiting of the disclosure. As used herein, the singular forms "a", "an" and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments of the present disclosure, these descriptions should not be viewed in a restrictive or limiting sense. Rather, there are several variations and modifications which may be made without departing from the scope of the appended claims.

The invention claimed is:

1. A vehicle having a support structure comprising:
   a front structural section for receiving a front axle assembly;
   a rear structural section opposite the front structural section in a longitudinal direction of the vehicle; and
   a support part arranged between the front structural section and the rear structural section as part of the support structure, the support part having a support wall which runs in a self-contained manner in a circumferential direction transversely with respect to the longitudinal direction of the vehicle, the support wall at least in part defining an engine or motor sump.

2. The vehicle of claim 1, wherein the self-contained profile of the support wall forms a cross section which differs along the longitudinal direction of the vehicle.

3. The vehicle of claim 1, wherein the support part has a front fastening intersection for connecting the support part to the front structural section.

4. The vehicle of claim 1, wherein the support part has a rear fastening intersection for connecting the support part to the rear structural section.

5. The vehicle of claim 3, wherein a connection between the support part and at least one of the structural sections is rigid and releasable.

6. The vehicle of claim 3, wherein a connection between the support part and at least one of the structural sections is integrally formed.

7. The vehicle of claim 1, wherein at least one spacer is arranged between a front fastening intersection and the front structural section or between a rear fastening intersection and the rear structural section.

8. The vehicle of claim 1, wherein the support part supports a vehicle component.

9. The vehicle of claim 8, wherein the vehicle component is of a multi-part design having a first part and at least one further part which is fixable to an installation intersection of the first part.

10. The vehicle of claim 1, wherein the support wall of the support part bounds a receiving channel along the circumferential direction for receiving a drive shaft of a vehicle drive train.

11. The vehicle of claim 1, wherein the front structural section has a grid-like structure with a plurality of structural struts, wherein at least some of the structural struts bound a receiving space, which is accessible in the transverse direction of the vehicle, for receiving the front axle assembly.

* * * * *